United States Patent [19]

Serizawa et al.

[11] Patent Number: 5,809,183
[45] Date of Patent: *Sep. 15, 1998

[54] METHOD AND APPARATUS FOR RECOGNIZING CHARACTER INFORMATION AT A VARIABLE MAGNIFICATION

[75] Inventors: Masahiro Serizawa; Yoshihiro Hosomi; Hirokazu Takahashi, all of Yokohama; Yoshio Mizuno, Ichikawa; Tokuharu Kaneko, Yokohama; Satoshi Kaneko, Kawasaki; Taisei Fukada, Yokohama; Keizo Isemura, Kokubunji; Akihiko Satoh, Kawasaki; Hirohiko Kishimoto, Yokohama; Masayoshi Taira, Tokyo; Noriaki Matsui, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 351,227

[22] Filed: Nov. 30, 1994

[30] Foreign Application Priority Data

Nov. 30, 1993 [JP] Japan .................................... 5-299308

[51] Int. Cl.⁶ .............................. G06K 9/32; G06K 9/00
[52] U.S. Cl. .......................... 382/301; 382/181; 382/318
[58] Field of Search .................................... 382/298, 301, 382/310, 209, 224, 318, 177, 181, 312; 358/451

[56] References Cited

U.S. PATENT DOCUMENTS

| | | |
|---|---|---|
| 3,710,323 | 1/1973 | Andrews et al. ........................ 382/298 |
| 4,132,978 | 1/1979 | Mercier .................................... 382/310 |
| 4,769,851 | 9/1988 | Nishijima et al. ....................... 382/298 |
| 5,197,107 | 3/1993 | Katsuyama et al. .................... 382/209 |
| 5,509,092 | 4/1996 | Hirayama et al. ....................... 382/301 |
| 5,715,336 | 2/1998 | Tanaka .................................... 382/301 |

*Primary Examiner*—Leo H. Boudreau
*Assistant Examiner*—Bhavesh Mehta
*Attorney, Agent, or Firm*—Fitzpatrick, Cella, Harper & Scinto

[57] ABSTRACT

A method and apparatus for recognizing character information in an original document with high recognition accuracy regardless of the size of a character to be recognized. An input image is processed by an image processing circuit and stored in an image recording unit. A character region in the recorded image data is detected by a recognition section, and the image corresponding to the detected character region is read with a predetermined magnification. Character recognition is performed on the image of the character region read at the predetermined magnification, in the recognition section. If the recognition accuracy does not satisfy a predetermined criterion, the same image is read again with a modified magnification wherein the magnification is determined on the basis of preset sizes and the size of the character pattern of a character to be recognized. The image obtained in this way is subjected again to character recognition processing until the recognition accuracy satisfies the predetermined criterion. A character pattern corresponding to the recognized character is generated, and recorded together with the image recorded in the image recording unit in an image recording section. Thus, an image is read with a magnification optimized depending on a character size of an original document image and on a recognition accuracy.

16 Claims, 5 Drawing Sheets

METHOD AND APPARATUS FOR RECOGNIZING CHARACTER INFORMATION AT A VARIABLE MAGNIFICATION

BACKGROUND OF THE INVENTION

1. Filed of the Invention

The present invention relates to a method and apparatus for recognizing character information, and more specifically, to a method and apparatus for optically reading an image of a document or other printed material and recognizing characters included in it.

2. Description of the Related Art

In conventional techniques for recognizing characters, an image is input at a size equal to its original size. A detected image within a specified character area is normalized into a predetermined size, and then subjected to character recognition processing.

However, in this conventional method, when a character having a small size is input the scale of normalization often severely distorts the character image. Such a normalized character image is not defined with sufficient accuracy to achieve high recognition accuracy.

SUMMARY OF THE INVENTION

The above problem is solved in a method and apparatus according to the present invention as will be described below. That is, according to one aspect of the present invention, there is provided an information recognition apparatus comprising: reading means for reading an image at a variable magnification; character recognition means for recognizing a character included in the image at a recognition accuracy defined by a predetermined criterion; and adjustment means for adjusting the variable magnification of the reading means when the recognition accuracy of the recognition means is less than the predetermined criterion whereby the image is read again at the adjusted magnification.

According to another aspect of the present invention, there is provide an information recognition method comprising: a reading step of reading an image at a variable magnification; a character recognition step of recognizing a character included in the image at a recognition accuracy defined by a predetermined criterion; an adjustment step of adjusting a reading magnification associated with the reading step when the recognition accuracy in the recognition step is less than the predetermined criterion whereby the image is re-read with the adjusted magnification.

According to another aspect of the present invention, there is provided a method and apparatus for recognizing information, further including means and a step of generating a pattern corresponding to a recognized character and then recording the generated pattern on a recording medium.

According to further aspect of the present invention, there is provided a method and apparatus for recognizing information, wherein the magnification with which an image is read is determined on the basis of preset sizes and a character pattern size of a character to be recognized, whereby the image is read with the optimized magnification depending on the size of a character to be recognized.

According to still another aspect of the present invention, there is provided an information recognition apparatus comprising: reading means for optically reading an image with a specified magnification; detecting means for detecting a character region in the image; character region recording means for recording the detected character region; recognition means for recognizing an image of the region recorded in the character recording means; adjustment means for adjusting a reading magnification of the reading means when the recognition accuracy of the recognition means is less than a predetermined criterion whereby the image is re-read with the adjusted magnification and re-recorded in the character region recording means.

According to another aspect of the present invention, there is provided an information recognition method comprising: a reading step of optically reading an image at a specified magnification; a detecting step of detecting a character region in the image; a character region recording step of recording the detected character region; a recognition step of recognizing an image of the recorded region at a predetermined accuracy; an adjustment step of adjusting a reading magnification associated with the reading step when the recognition accuracy obtained in the recognition step is less than a predetermined criterion; whereby the image is re-read at the adjusted magnification, re-recorded, character recognition is repeated.

According to the above process with the above arrangement of the present invention, an image is always read with a magnification optimized depending on a character size to be recognized, and thus high recognition accuracy is achieved regardless of the character size of an original document.

According to still another aspect of the present invention, there is provided a method and apparatus for recognizing information, wherein the above-described adjusted magnification is stored, and a pattern corresponding to a character is generated according to the stored magnification so that each recognized character is printed at its original size.

DESCRIPTION OF THE PREFERRED EMBODIMENT

Referring to the accompanying drawings, an embodiment of the present invention will be described in detail below. In the embodiment described below, the present invention is applied to, but not limited to, a copying machine having the capability of character recognition.

Figure 1:
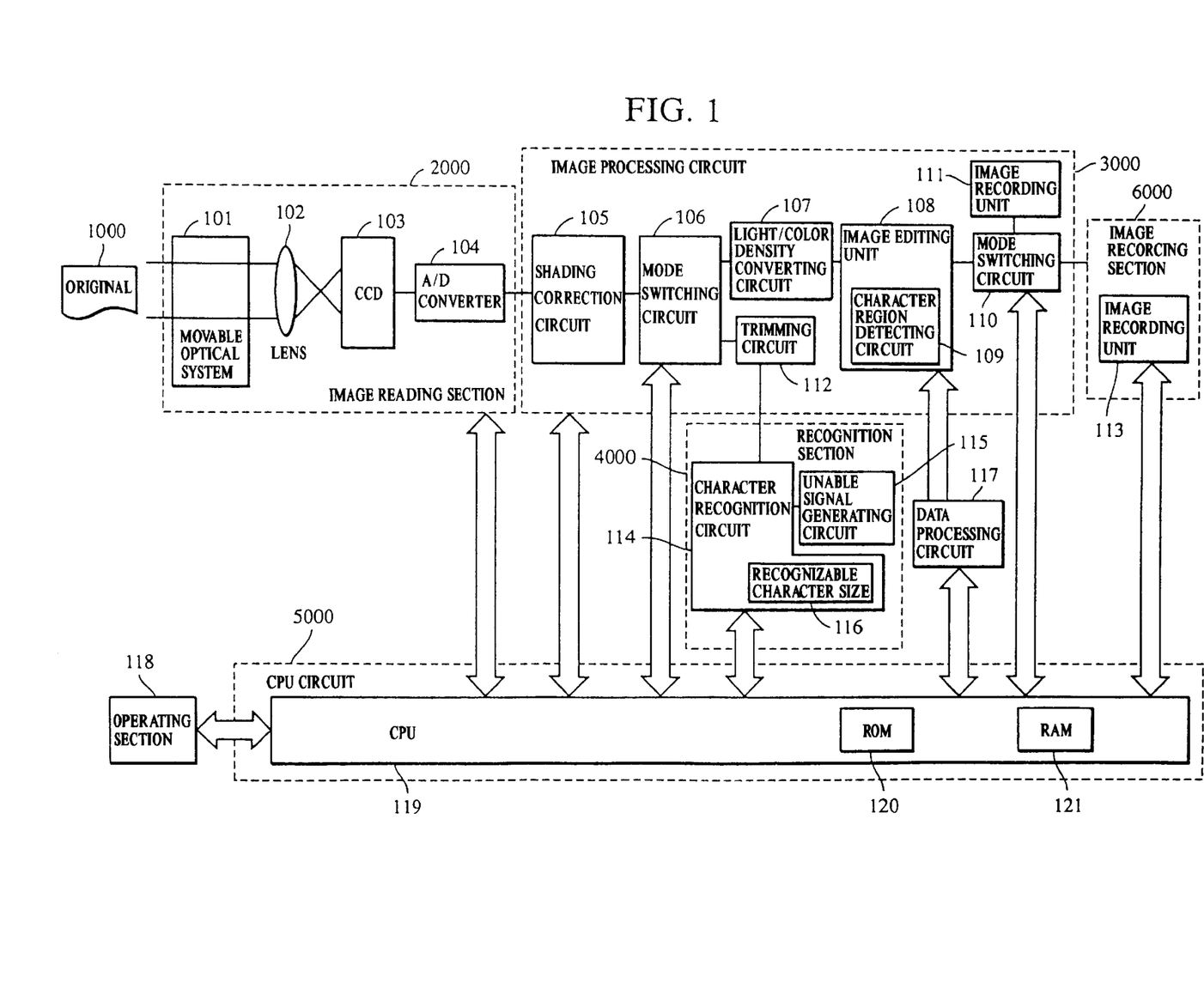
FIG. 1 is a schematic diagram illustrating an apparatus according to an embodiment of the present invention.

FIG. 1 is a block diagram illustrating the controller section of an image copying apparatus according to the embodiment of the invention.

The image of an original document 1000 is read by an image reading section 2000 including a movable optical system (that moves in the secondary scanning direction of an original document) 101, a lens 102, a CCD 103, and an analog-to-digital converter 104. The analog-to-digital converter 104 converts an image signal, received via the movable optical system, lens 102, and CCD 103, from analog form into digital form, and outputs the resultant digital signal to an image processing circuit 3000.

In particular, when the image is to be reduced to ½ of the original size, the movable optical system 101 is moved at twice a normal speed such that the image size is reduced to ½ in a secondary scanning direction. The CCD 103 extracts every other pixel of the image such that the image size is reduced to ½ in a primary scanning direction. When the image is to be enlarged to twice the original size, the movable optical system 101 is moved at half the normal speed such that the image is enlarged by a factor of 2 in the secondary scanning direction. In the primary scanning direction, data for the same pixel is read twice, or alternatively, one pixel is added between two original adjacent pixels by means of extrapolation. Control processing for the image reading section 2000 is performed by a CPU 119.

The image data that has been read in the above-described manner is directed to an image processing circuit 3000. In the image processing circuit 3000, shading correction is performed by a shading correction circuit 105, and the image data is then directed to a mode switching circuit 106.

The mode switching circuit 106 selects a proper circuit to which the data is output depending on whether the apparatus is operating in a recognition mode or image reading mode. In the case of the image reading mode, the image data is sent to an image editing unit 108 via a light/color density converting circuit 107. The image editing unit 108 receives, via a data processing circuit 117, control data, associated with image processing conditions stored in RAM 121 in a CPU 119 of a CPU circuit 5000, and then processes the image data according to the received control data associated with the image processing conditions. The processed image data is then sent to a second mode switching circuit 110, by which the image data is directed to additional circuitry depending on whether the apparatus is in an image recording mode or image copying mode. If the apparatus is in the image copying mode, the mode switching circuit directs the image data from the image processing circuit 3000 to an image recording section 6000.

The image recording section 6000 includes a control circuit that controls a motor for transferring copying paper, a laser recording circuit for writing a video signal received from the image processing circuit 3000 onto a photoconductor drum, and a developing control circuit for controlling a development process.

When the apparatus is in an image recording mode, the image data is transferred via the mode switching circuit 110 to an image recording unit 111 for storing the data. The image recording unit 111 (a hard disk storage unit, for example) stores the video signal or the image data sent from the image editing unit 108. The image editing unit 108 has a character region detecting circuit 109 that detects a character region in the image data stored on the image recording unit 111 and also detects the sizes of characters in the detected character region. The detected data representing the character region and the character sizes are stored as character feature data in RAM 121 of the CPU circuit 5000.

In the image recording mode, character features are detected and stored in the above-described manner, whereupon the operational mode is automatically changed from the image recording mode to the recognition mode.

After the operational mode has been changed to the recognition mode, the image reading section 2000 reads the image again. During the image reading process in the recognition mode, the image reading section 2000 adjusts the reading magnification according to character feature data stored in the RAM 121 so that the character size associated with the character region of the original document 1000 corresponds to one of recognizable character size data 116 included in a character recognition section 4000. The image data read by the image reading section 2000 is then transferred to the image processing circuit 3000.

In the recognition mode, the image data is directed to a trimming circuit 112 in the image processing circuit 3000 by the first mode switching circuit 106. The trimming circuit 112 extracts the data associated with the specified character region from the input data according to the character feature data stored in the RAM 121 of the CPU circuit 5000, and outputs the extracted data to the recognition section 4000.

In the recognition section 4000, the trimmed image data is first applied to a character recognition circuit 114. The character recognition circuit 114 sequentially extracts image data (a character pattern) one character at a time, and performs character recognition on each extracted character pattern. The character recognition circuit 114 includes a dictionary including reference patterns for use in the character recognition. If the recognition accuracy obtained by the character recognition circuit 114 is less than a predetermined criterion, for example, if the probability that the obtained character codes coincide with correct character codes is less than a predetermined value, a failure signal is generated by a failure signal generator 115. When a failure signal is generated, the character feature data, associated with a character that failed recognition, is read from the RAM 121 and the image in the region that includes the character is read again in the recognition mode with a new magnification determined according to a magnification modifying procedure stored in ROM 120 of the CPU circuit 5000. For example, a new magnification may be determined from the current magnification by calculating the ratio of the dot size of the character that has failed recognition to the dot size or sizes preset in the RAM 121. The image data is trimmed and character recognition is again attempted.

The process of modifying input magnification repeats, according to a procedure stored in the ROM 120, until completion; completion is defined here as attempted character recognition with magnifications corresponding to all available dot sizes preset in the RAM 121. If a failure signal is still present after completion of the character recognition process, a warning signal is displayed on an operating section 118.

The operating section 118 includes a set of keys for giving various commands to the image processing circuit 3000 which specify various conditions of image editing and image copying processes, such as the number of copies, the magnification, etc. The operating section 118 also includes various LEDs and a display area for displaying information associated with the operation.

In the above operation, if the character recognition mode is selected, the image of an original document is stored temporarily in the image recording unit 111. A character region, in the stored image, is read with a predetermined magnification (by the trimming circuit 112). The character recognition circuit 4000 performs character recognition on all characters included in the character region. However, if a character fails to be recognized, the size of the character is compared to a value preset in the apparatus, and the magnification with which the previous reading process was performed is multiplied by the comparison result. The character is read again with a magnification equal to the above product and character recognition is again attempted. If the recognition accuracy rate is higher than a predetermined value, then character codes corresponding to the recognized characters and the magnification with which the characters have been successfully recognized are added to the character feature data stored in the RAM 121.

If a character remains that was not recognized successfully in the above process, an image of the character, as well as a warning notifying of the occurrence of a recognition failure, is displayed on the display screen of the operating section 118. An operator may then input a correct character code via a keyboard or the like (not shown).

Once all characters have been recognized successfully or corrected by the operator via the keyboard, or alternatively if the operator issues a command indicating compulsory execution of the copying process, character patterns corresponding to the character codes of the recognized characters are generated by, for example, the ROM 120 (the ROM 120 is assumed to include outline font data in the embodiment), and sent to the image editing unit 108 by the data processing circuit 117. In this process of generating character patterns corresponding to character codes of the recognized characters, the character feature data stored in the RAM 121 is used to adjust the dot size of each character according to the magnification with which the character was read, thereby printing all characters with sizes corresponding to the character images of the original document. In the image editing unit 108, the image data stored previously is read out, and then combined with the character patterns obtained by character recognition so as to form a composite image. The composite image obtained in this way is output to the image recording section 6000.

Figure 2:
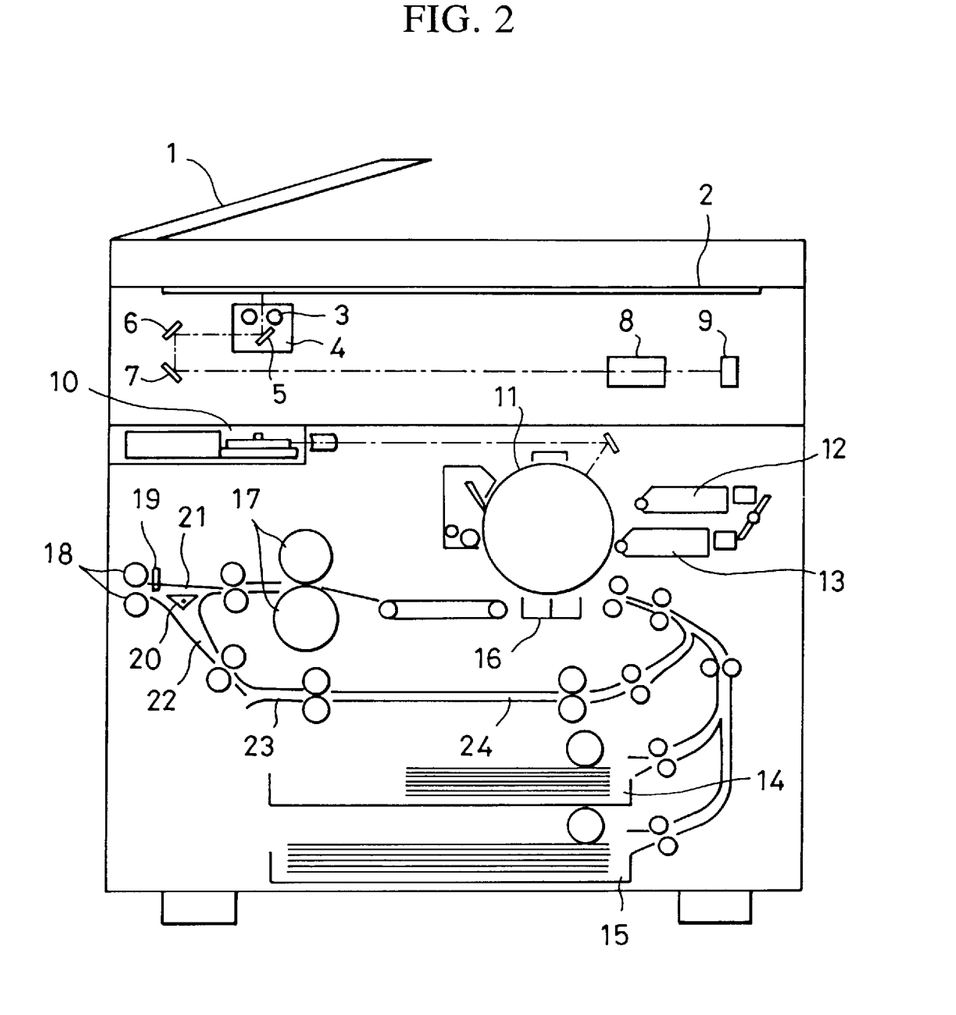
FIG. 2 is a cross-sectional view of the apparatus according to the embodiment of the invention.

FIG. 2 is a cross-sectional view of an image copying apparatus according to the present invention in which the image recording section 6000 is chiefly illustrated.

In FIG. 2, reference numeral 1 denotes an original document feeder serving as original feeding means for feeding one or two sheets of original documents at a time onto an original document glass plate 2. Reference numeral 4 denotes a scanner comprising a lamp 3, scanning mirror 5, etc. After an original document has been fed by the original feeder 1 and placed on the original glass plate 2, the scanner scans the original document sheet forward and backward in a predetermined direction. During this scanning process, a light beam is reflected from the original document and travels through scanning mirrors 5–7 and a lens 8 to an image sensor 9 on which the image of the original document is focused. Reference numeral 10 denotes an exposure controller including a laser scanner, for illuminating a photoconductive drum with a light beam modulated by the image data provided by an image signal controller of the exposure controller. Reference numerals 12 and 13 denote developing units for developing an electrostatic latent image formed on the photoconductive drum 11 so that the latent image becomes visible. Reference numerals 14 and 15 denote copying paper trays for stocking stacked recording media having a standard size. A sheet of copying paper is fed via feeding rollers to a resist roller, which in turn adjusts the position of an end of the sheet of copying paper so that the image formed on the photoconductive drum 11 will be transferred onto the sheet at a correct position.

Reference numeral 16 denotes a transfer-and-separation charger whereby the toner image developed on the photoconductive drum 11 is transferred onto the copying paper, after which the copying paper is separated from the photoconductive drum 11. The copying paper is further carried via a carrying belt to a fixing unit 17 at which the image on the copying paper is fixed. Reference numeral 18 denotes feeding-out rollers between which the copying paper, having the copied image, is fed out onto an output tray. Reference numeral 19 denotes a directional flapper adapted to switch the transfer direction of the copying paper between the output tray and the inside of the apparatus so that superposition copying or two sided copying is possible if required.

Figure 3:
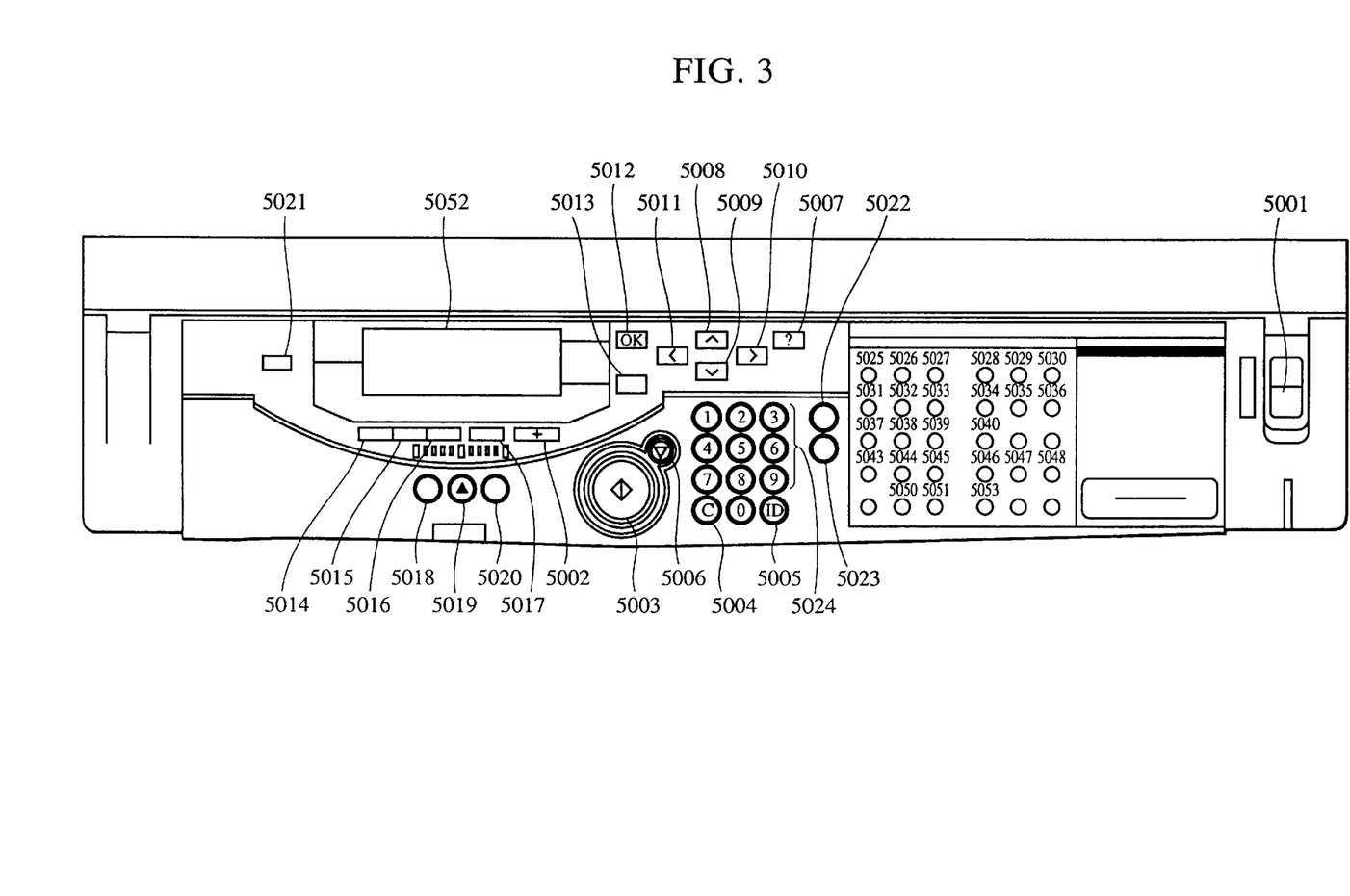
FIG. 3 is a schematic diagram illustrating the operating section of the apparatus according to the embodiment of the invention.

FIG. 3 is a schematic diagram illustrating the operating section 118 of the image copying apparatus of the present invention.

In FIG. 3, reference numeral 5001 denotes a power switch for controlling the supply of electric power to the image copying apparatus. Reference numeral 5002 denotes a reset key. If this key is pressed during a stand-by state, the operation mode is reset to the standard mode. Reference numeral 5003 denotes a copy starting key. Reference numeral 5004 denotes a clear key used to clear a numerical value. Reference numeral 5005 denotes an ID key that allows only particular operators to use the copying apparatus. The other operators cannot use the apparatus unless his or her ID entered via the ID key is accepted. Reference numeral 5006 denotes a stop key used to stop or terminate the copying operation. Reference numeral 5007 denotes a guide key. If this key is pressed, information on various functions are provided. Reference numeral 5008 denotes an up cursor key for moving a pointer on a screen upward while setting various functions. Reference numeral 5009 denotes a down cursor key for moving a pointer on the screen downward. Reference numeral 5010 denotes a right cursor key and reference numeral 5011 denotes a left cursor key.

Reference numeral 5012 denotes an OK key that is pressed when functions have been set correctly. A key denoted by reference numeral 5013 is used to execute an operation that has been set and that is now displayed in a lower right area in a display screen 5052. Reference numeral 5014 denotes a reduction key for selecting a reduction ratio from a set of standard reduction ratios. If a key denoted by reference numeral 5015 is pressed, the copying operation will be done such that the size of the copied image will be the same as that of the original image. Reference numeral 5014 denotes a magnification key for selecting a magnification ratio from a set of standard magnification ratios. Reference numeral 5017 denotes a cassette selection key for selecting a cassette stage to be used in copying operations. Reference numeral 5018 denotes a contrast adjusting key for manually lowering the contrast. Reference numeral 5019 denotes an AE (automatic exposure) key. When this key is pressed, the copying contrast is automatically optimized taking into account the contrast of an original image. Reference numeral 5020 denotes a contrast adjusting key for manually raising the contrast. A key denoted by reference numeral 5021 is used to specify a sorting operation. Reference numeral 5022 denotes a preheating key for switching on or off the preheating operation mode. Reference numeral 5023 is an interruption key used to perform an copying operation during another copying operation. Reference numeral 5024 denotes a ten-key numeric keypad for inputting a numerical value.

Reference numeral 5025 denotes a marker processing key for setting conditions associated with trimming, masking, and partial treatment (contour processing, mesh processing, shading, negative/positive processing). Reference numeral 5026 denotes a patterning key used to express colors by patterns or graded gray tones. Reference 5027 denotes a color elimination key used to eliminate a particular color. Reference numeral 5028 denotes a sharpness adjusting key used to adjust the sharpness. Reference numeral 5029 denotes a negative/positive key for selecting negative or positive processing.

Reference numeral 5030 denotes an image creating key for performing contour processing, shading, mesh processing, character slant processing, mirror processing, or repeat processing. Reference numeral 5031 denotes a trimming key for trimming an image into a specified area. Reference numeral 5032 denotes a masking key for masking a specified area. Reference numeral 5033 denotes a partial treatment key for specifying a particular area and further specifying partial treatment (contour processing, mesh processing, shading, negative/positive processing). Reference numeral 5034 denotes a frame eliminating key for eliminating a frame according to a specified mode. The modes include sheet frame elimination mode (creating a frame according to a sheet size), document frame elimination mode (creating a frame according to a specified document size), and book frame elimination mode (creating a frame according to a specified size of a spread book and also creating a white space in the middle area). Reference numeral 5035 denotes a binding area key for creating a binding area at an end of a sheet. Reference numeral 5036 denotes a shift key for specifying a shift operation such as parallel shifting (upward, downward, left, right), centering, corner justifying, and shifting to a specified point.

Reference numeral 5037 denotes a zooming key for setting a copying magnification in the range from 25% to 400% in steps of 1%. When setting the copying magnification, the magnification can be specified separately for the primary scanning direction and the secondary scanning direction. Reference numeral 5038 denotes an automatic magnification key. When this key is pressed, the magnification is automatically set depending on copying paper size, wherein the magnification is determined separately for the primary scanning direction and the secondary scanning direction. Reference numeral 5039 denotes an enlarge-and-separate key. If this key is pressed, an image of one sheet of original document is enlarged and copied on plural sheets so that the original image is divided into the plural sheets. Reference numeral 5040 denotes a reduction layout key for combining a plurality of original documents into one copying sheet wherein the images are magnified or reduced with a proper ratio. Reference numeral 5043 denotes a divide-into-two-sheet key. If this key is pressed, the copying area of the original glass plate is divided into right-half and left-half areas, and respective half areas are copied on individual sheets (two different pages, or front and back sides of one sheet).

Reference numeral 5044 denotes a two-sided copy key for producing a two-sided copy (single-side originals to a two-sided copy, single pages to a two-sided copy, a two-sided original to a two-sided copy). Reference numeral 5045 denotes a multiple copying key for performing a multiple copying operation (simple multiple copying, multiple continuous page copying).

Reference numeral 5046 denotes a memory key for performing an operation in a memory mode (memory composition, area composition, superimposing composition). Reference numeral 5047 denotes a projector key. This key is pressed when a projector is used. Reference numeral 5048 is a printer key for setting conditions for printing operations. Reference numeral 5050 denotes a hybrid size key. This key is pressed when various mixed sizes of original document sheets will be fed from the feeder. Reference numeral 5051 denotes a mode memory key for registering a specified copying mode. This key is also used to call a registered copying mode. Reference numeral 5052 denotes a display screen for displaying the state of the apparatus, the number of sheets to be copied, the copying magnification, the size of copying paper, etc. The display screen 5052 is also used to display setting conditions defined during a set copy mode operation.

A key denoted by reference numeral 5053 is used to switch the operating mode between normal copying mode and character recognition mode. When the operating mode is set to the character recognition mode, the first mode switching circuit 106 shown in FIG. 1 is set to the image reading mode, and the second mode switching circuit 110 is set to the copying mode. The character recognition mode that has been set by the key 5053 can be reset by the reset key 5002.

Figure 4:
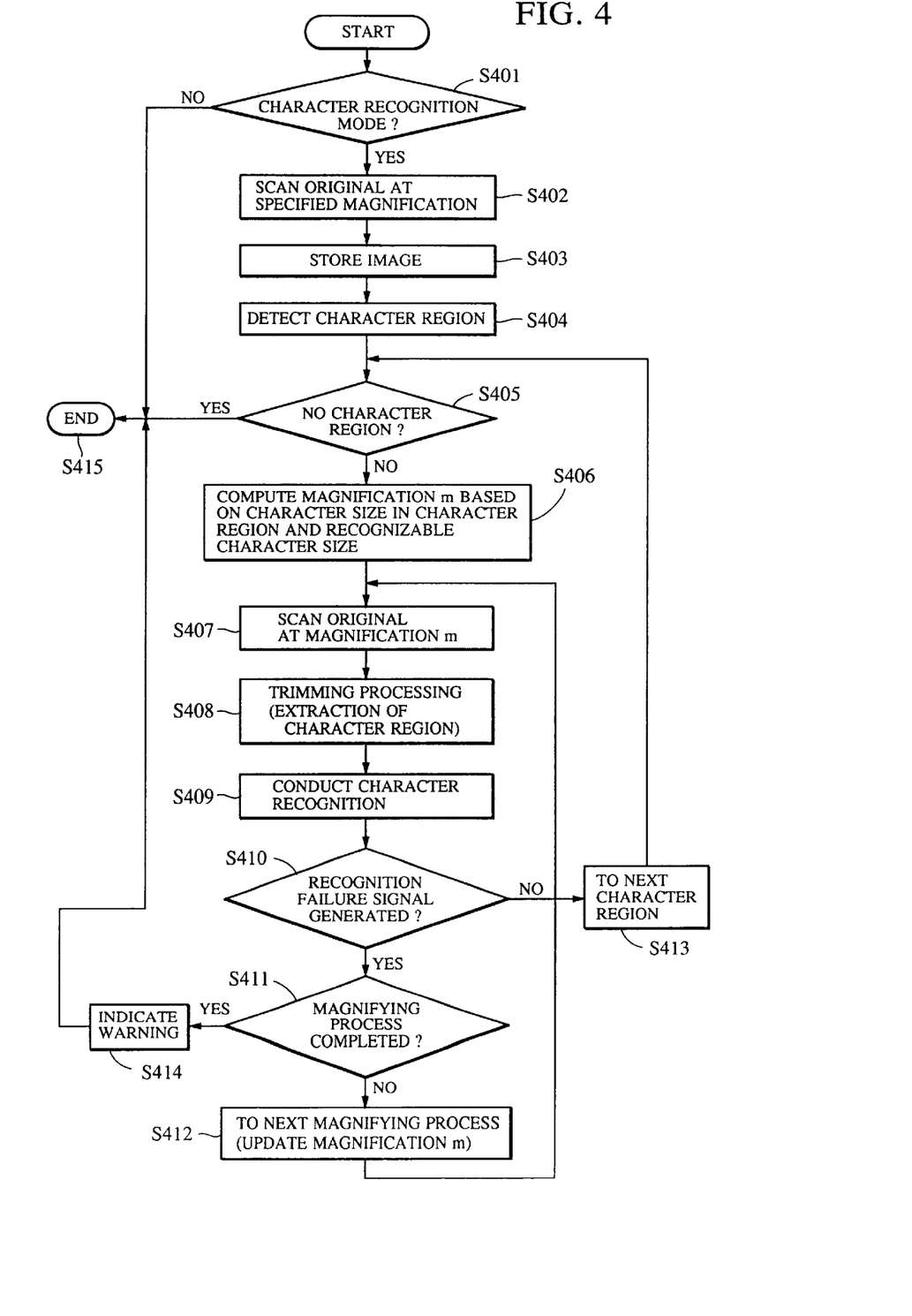
FIG. 4 is a flow chart illustrating a character recognition mode process performed according to an embodiment of the invention.
Figure 5:
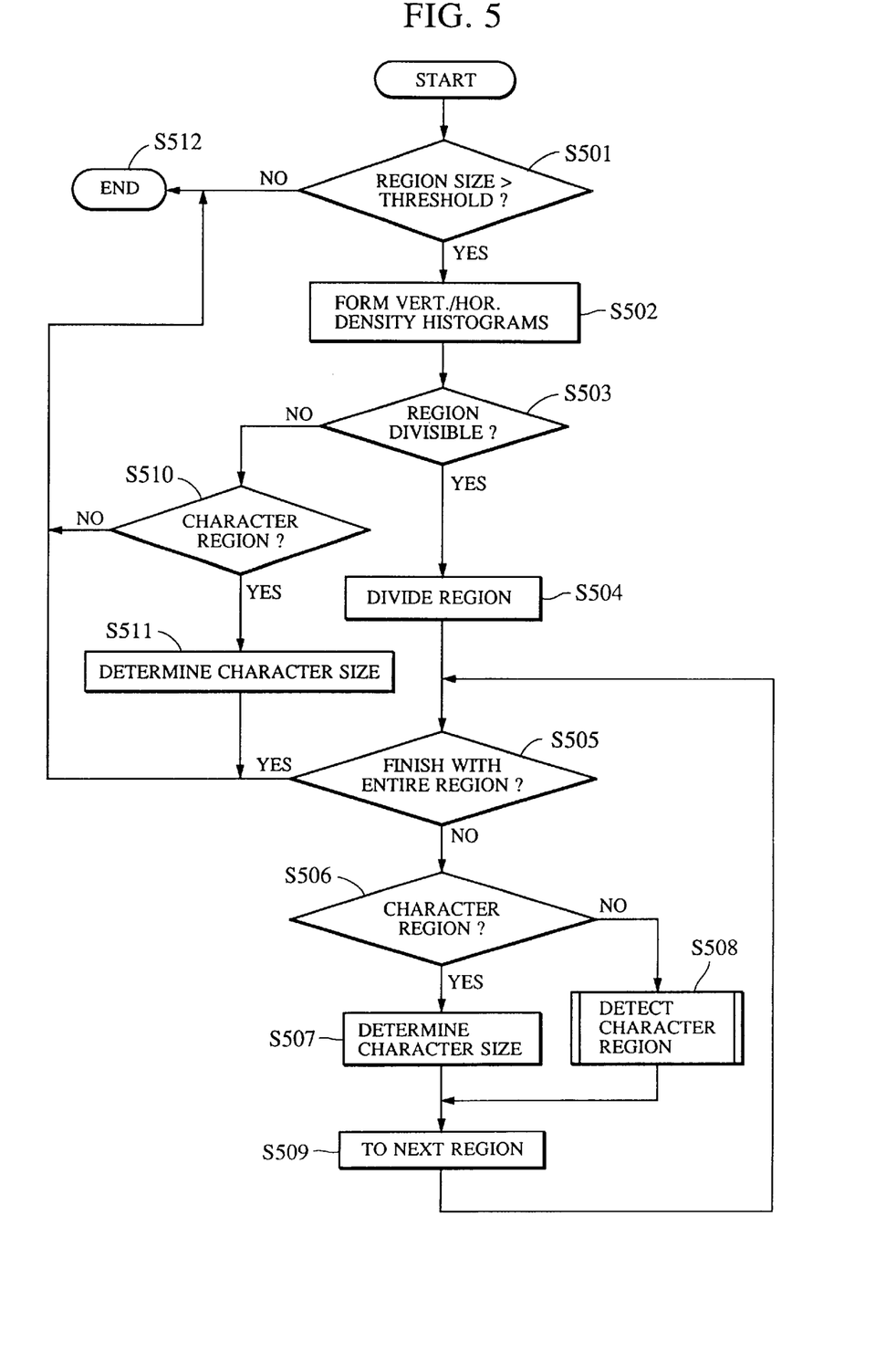
FIG. 5 is a flow chart illustrating a character region detection process performed according to an embodiment of the invention.

FIG. 4 is a flow chart illustrating the process steps executed in the character recognition mode according to the present embodiment of the invention. The procedure (program) of the processes shown in FIG. 4 and FIG. 5 are stored in the ROM 120.

The process begins with a decision whether the operation is set to the character recognition mode or not (step S401). If the operation is not set to the character recognition mode, then the process exits from the character recognition mode (step S415). If the operation is set to the character recognition mode, then an original document is scanned (prescanned) with a predetermined magnification (step S402), and the scanned image data is stored on the image recording unit 111 (step S403).

The character region of the image data stored on the image recording unit 111 is detected (step S404), and information respecting the location of the character region of the image data as well as information respecting the approximate sizes of characters included in the character region is obtained. If there are a plurality of character regions containing characters having the same size, these character regions are combined into one region. If no character region has been found (step S405), then the process exits from the character recognition mode (step S415). If a character region has been detected, the character size of this region is determined (if the region includes characters having different sizes, the character size of the region is defined by a representative size that appears most frequently), and the determined character size is compared with recognizable character sizes preset in the character recognition means 4000 so as to determine a magnification m (step S406).

The original document is scanned again with the determined magnification m (step S407). The obtained image data is subjected to a trimming process and the character region to be recognized is extracted (step S408). The image data in this extracted region is then directed to the character recognition means 4000. The character recognition means 4000 performs character recognition processing on all characters included in the input data(step S409). If the character recognition accuracy rate is less than a predetermined threshold, a recognition failure signal is generated by the failure signal generator 115 of the character recognition means 4000. If a recognition failure signal is generated (step S410), the magnification is modified according to a predetermined procedure (step S411), and the magnification m is updated to a new value (the magnification is increased) (step S412). The original document is scanned again with the new magnification m (step S407), and the obtained image data is trimmed (step S408) and then subjected to further character recognition processing (step S409). In step S411, if the entire procedure of modifying the magnification has been completed, then character recognition of this character region is regarded as impossible, and a warning is displayed (step S414). The process then exits from the character recognition mode (step S415). If the process has passed step S410 without generating a recognition failure signal, character recognition on this character region is regarded as having been completed successfully. The process proceeds to step S413 and performs character recognition on the next character region by returning to step S405.

FIG. 5 is a flow chart illustrating the character region detecting process performed at step S404 according to the present embodiment of the invention.

Character region detection is done on a rectangular region only if this rectangular region has a size greater than a predetermined threshold (step S501). If the size of this rectangular region is less than the threshold, then the process exits from the character region detecting step (step S512). In the character region detection processing, image density histograms in the vertical and horizontal directions are produced (step S502), and then a decision is made whether the region can be sub-divided (step S503). This decision can be made, for example, by determining if there is a count equal to or nearly equal to 0 in either histogram in the vertical or horizontal direction. The region is regarded as divisible at that position. If the region is divisible, the region is divided (step S504), and region information is stored. If there is no region to be processed (step S505), then the process exits from the character region detection processing (step S512).

At step S505, if there is a region to be processed, then the process proceeds to step S506, at which a decision is made whether the region is a character region or not. The region is regarded as a character region if the image intensity has gaps at approximately constant intervals in a direction perpendicular to the long sides of the rectangular region. Once the region is designated as a character region in step S506, character size is determined from information previously obtained on this region (step S507). In cases where a region has been designated as a non-character region in step S506, character region detection processing is done recursively on the region (step S508).

After either step S507 or step S508 has been completed, the process is repeated on the next region (step S509). At step S503, if the region is regarded as in-divisible, then whether or not the region is a character region is determined in step S510 according to the same decision method as in step S506. If the region is a character region, then the character size is detected and the obtained size value is stored at step S511 as in step S507. The process then exits from character region detection processing (step S512). If the region is a non-character region, then the process exits directly from character region detecting processing (step S512).

In the present embodiment of the invention, as described above, if the recognition accuracy rate in the processing of recognizing characters included in an original document image is less than a predetermined threshold, then the character size is regarded as unsuitable, and character recognition processing is repeated using a modified reading magnification. Thus, the total character recognition accuracy rate is improved.

In the above embodiment, the present invention is applied to a copying apparatus. However, it will be apparent to those skilled in the art that the invention can also be applied to various types of apparatus. What is advantageous in this invention is that if the recognition accuracy does not satisfy a predetermined criterion in the first character recognition attempt, the original document is re-read with a modified magnification (usually greater than the previous magnification), and character recognition is repeated.

Furthermore, the invention may also be applied to a system comprising: separate reading means for reading an original document image with a variable magnification; and an apparatus for processing the data obtained by the reading means (for example an image scanner and a personal computer). In this case, a program is loaded on the processing apparatus (personal computer), and the above-described processing is performed according to the program. The invention can be broadly applied to various stand-alone apparatus, systems including a plurality of apparatus, and other systems that operate according to a programmed procedure.

In the above example, the original image is read twice. However, the image may be read three or more times, each with modified magnifications, within an acceptable time period.

When the invention is applied to a copying apparatus as in the above embodiment, if there is a character that could not be recognized successfully, the apparatus may also be adapted to output the original character image without requesting an operator to input a correction. In this case, while the printing quality of unrecognizable characters will be similar to that obtained in a conventional copying machine, the apparatus requires no operator assistance.

What is claimed is:

1. An information recognition apparatus comprising:

scanning control means for scanning a document image at a variable magnification;

detecting means for detecting a character region in a document image scanned at an initial magnification;

character recognition means for recognizing a character of the detected character region and for determining a recognition accuracy of the character recognition;

adjustment means for adjusting the variable scanning magnification for re-scanning, at a magnification other than the initial magnification in a case that the accuracy of said character recognition is less than a predetermined criterion; and control means for extracting, from a re-scanned document image, a character region corresponding to the character region detected in the document image scanned at the initial magnification.

2. An information recognition apparatus according to claim 1, further comprising:

pattern generating means for generating a pattern corresponding to a character obtained by the recognition means; and image recording means for recording the generated pattern on a recording medium.

3. An information recognition apparatus according to claim 1, further comprising control means for determining said magnification other than the initial magnification on the basis of preset sizes and a size of a character pattern of a character to be recognized.

4. An information recognition method comprising:

scanning a document image at an initial magnification;

detecting a character region in the document image scanned at the initial magnification;

recognizing a character of the detected character region;

determining a recognition accuracy of said recognizing step;

adjusting a magnification for re-scanning, at a magnification other than the initial magnification, in a case that the recognition accuracy of said character recognition is less than a predetermined criterion; and extracting, from a re-scanned document image, a character region corresponding to the character region detected in the document image scanned at the initial magnification.

5. An information recognition method according to claim 4, further comprising:

generating a pattern corresponding to a character obtained in the character recognition step; and recording the generated pattern on a recording medium.

6. An information recognition method according to claim 4, wherein said magnification other than the initial magnification is determined on the basis of preset sizes and a size of a character pattern of a character to be recognized.

7. An information recognition apparatus comprising:

scanning means for optically reading a document image at a specified magnification;

detecting means for detecting a character region in a document image read at an initial magnification;

character region recording means for recording said detected character region;

recognition means for recognizing an image of the region recorded in said character region recording means;

adjustment means for adjusting a reading magnification for re-reading, at a magnification other than the initial magnification, in a case that a recognition accuracy of said recognition means is less than an predetermined criterion, and control means for extracting, from a re-read document image, a character region corresponding to the character region detected in the document image read at the initial magnification, said control means also for re-recording the extracted image in said character region recording means.

8. An information recognition apparatus according to claim 7, further comprising:

pattern generating means for generating a pattern corresponding to a character recognized by the recognition means; and image recording means for recording the generated pattern on a recording medium.

9. An information recognition apparatus according claim 8, further comprising:

magnification storing means for storing said adjusted magnification; and size adjustment means for adjusting the size of the pattern generated by said pattern generating means according to the magnification stored in said magnification storing means.

10. An information recognition apparatus according to claim 7, further comprising control means for determining said magnification other than the initial magnification on the basis of preset sizes and a size of a character pattern of a character to be recognized.

11. An information recognition method comprising:

optically reading a document image at an initial magnification;

detecting a character region in the document image read at the initial magnification;

recording said detected character region;

recognizing an image of the recorded region;

determining an accuracy of the recognition;

adjusting a reading magnification for re-reading, at a magnification other than the initial magnification, in a case that the recognition accuracy determined in said determining stop is less than a predetermined criterion; and extracting, from a re-read document image, a character region corresponding to the detected character region detected in the document image read at the initial magnification and re-recording the extracted image.

12. An information recognition method according to claim 11, further comprising:

generating a pattern corresponding to a character obtained by recognition; and recording the generated pattern on a recording medium.

13. An information recognition method according claim 12, further comprising storing said adjusted magnification; and adjusting the size of the pattern generated in said pattern generating step according to said stored magnification.

14. An information recognition method according to claim 11, wherein said magnification other than the initial magnification is determined on the basis of preset sizes and a size of a character pattern of a character to be recognized.

15. A computer-readable memory medium storing computer-executable process steps, the steps comprising:

a scanning step to scan a document image at an initial magnification;

a detecting step to detect a character region in a document image scanned at the initial magnification;

a recognizing step to recognize a character of the detected character region and to determine a recognition accuracy of the character recognition;

an adjusting step to adjust the variable scanning magnification for re-scanning, at a magnification other than the initial magnification, in a case that the accuracy of the character recognition is less than a predetermined criterion; and an extracting step to extract, from a re-scanned document image, a character region corresponding to the character region detected in the document image scanned at the initial magnification.

16. A computer-readable memory medium storing computer-executable process steps, the steps comprising:

a scanning step to optically read a document image at an initial magnification;

a detecting step to detect a character region in the document image read at the initial magnification;

a recording step to record said detected character region;

a recognizing step to recognize an image of the region recorded in said recording step;

an adjusting step to adjust a reading magnification for re-reading, at a magnification other than the initial magnification, in a case that a recognition accuracy of said recognition step is less than an predetermined criterion, and an extracting step to extract, from a re-read document image, a character region corresponding to the detected character region detected in the document image read at the initial magnification and to re-record the extracted image.

* * * * *

UNITED STATES PATENT AND TRADEMARK OFFICE
CERTIFICATE OF CORRECTION

PATENT NO. : 5,809,183

DATED : September 15, 1998

INVENTORS : Masahiro Serizawa, et al.

It is certified that error appears in the above-identified patent and that said Letters Patent is hereby corrected as shown below:

COLUMN 6

Line 56, "an" (second occurrence) should read --a--.

COLUMN 9

Line 44, "in-divisible" should read --indivisible--.

COLUMN 11

Line 31, "an" should read --a--.

COLUMN 12

Line 5, "stop" should read --step--;
Line 17, "according" should read --according to--; and
Line 18, "comprising" should read --comprising:--.

Signed and Sealed this

Sixth Day of July, 1999

Attest:

Q. TODD DICKINSON

*Attesting Officer*     *Acting Commissioner of Patents and Trademarks*